United States Patent
Jörg et al.

(10) Patent No.: US 9,909,522 B2
(45) Date of Patent: Mar. 6, 2018

(54) METHOD AND APPARATUS FOR CONTROLLING AN ENGINE BASED ON A TARGET PRESSURE CURVE

(71) Applicant: JAGUAR LAND ROVER LIMITED, Warwickshire (GB)

(72) Inventors: Christian Jörg, Aachen (DE); Thorsten Schnorbus, Aachen (DE); Ben Neaves, Coventry (GB); Lukas Schaefers, Aachen (DE); Daniel Neumann, Coventry (GB); Kiran Bandila, Coventry (GB); Simon Jarvis, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/097,831

(22) Filed: Apr. 13, 2016

(65) Prior Publication Data
US 2017/0298857 A1    Oct. 19, 2017

(51) Int. Cl.
*F02D 41/40*    (2006.01)
*F02D 35/02*    (2006.01)
(Continued)

(52) U.S. Cl.
CPC ............ *F02D 41/401* (2013.01); *F02B 75/18* (2013.01); *F02D 35/023* (2013.01);
(Continued)

(58) Field of Classification Search
CPC .. F02D 41/401; F02D 41/3836; F02D 35/024; F02D 35/025; F02D 2200/024; F02D 35/023; F02B 75/18
See application file for complete search history.

(56) References Cited

U.S. PATENT DOCUMENTS 5,544,635 A * 8/1996 Hara .................... F02P 5/1455
                                                                                         123/406.26
6,062,193 A * 5/2000 Gatellier ............... F02D 35/023
                                                                                         123/299
(Continued)

FOREIGN PATENT DOCUMENTS

WO    WO 2008110346 A2 *    9/2008    ............ F02D 35/023

OTHER PUBLICATIONS

Jorg, et al., Feedforward Control Approach for Digital Combustion Rate Shaping Realizing Predefined Combustion Processes, SAE International, 2015-01-0876k, Published Apr. 14, 2015.

*Primary Examiner* — David Hamaoui
(74) *Attorney, Agent, or Firm* — Carlson, Gaskey & Olds (57) ABSTRACT

An illustrative example method of controlling an engine of a vehicle, includes determining a target pressure curve for a cylinder of the engine for a first combustion cycle, determining a heat release model for the cylinder for the first combustion cycle, determining a mass flow of fuel from the heat release model to achieve the target pressure curve during the first combustion cycle, and automatically controlling opening of an injector of the cylinder of the engine during the first combustion cycle to provide the determined mass flow of fuel to the cylinder. The method includes determining a real pressure curve during the first combustion cycle and automatically adjusting at least one of the heat release model or the mass flow for a second, subsequent combustion cycle based on a difference between the target pressure curve and the real pressure curve.

20 Claims, 3 Drawing Sheets

(51) Int. Cl.
*F02D 41/38* (2006.01)
*F02B 75/18* (2006.01)

(52) U.S. Cl.
CPC ......... *F02D 35/024* (2013.01); *F02D 35/025* (2013.01); *F02D 41/3836* (2013.01); *F02D 2200/024* (2013.01)

(56) References Cited

U.S. PATENT DOCUMENTS

| | | | |
|---|---|---|---|
| 6,283,095 B1* | 9/2001 | Krueger | F02M 57/027 123/499 |
| 6,711,945 B2* | 3/2004 | Fuerhapter | F02B 1/12 73/114.01 |
| 6,722,345 B2* | 4/2004 | Saeki | F02D 35/023 123/299 |
| 6,935,304 B1* | 8/2005 | Liu | F02D 35/023 123/299 |
| 7,472,686 B2* | 1/2009 | Yasui | F02D 41/1401 123/406.23 |
| 7,806,100 B2* | 10/2010 | Schnorbus | F02D 35/02 123/299 |
| 8,676,471 B2* | 3/2014 | Catanese | F02D 35/028 123/435 |
| 2005/0005902 A1* | 1/2005 | Vermonet | F02D 41/403 123/299 |
| 2011/0088459 A1 | 4/2011 | Tugnolo et al. | |
| 2012/0324989 A1 | 12/2012 | Patel et al. | |
| 2016/0377020 A1 | 12/2016 | Oyagi et al. | |

* cited by examiner

METHOD AND APPARATUS FOR CONTROLLING AN ENGINE BASED ON A TARGET PRESSURE CURVE

TECHNICAL FIELD

The present disclosure relates to a method of controlling an engine of a vehicle, a control unit and in particular, but not exclusively, to a controller and a method for controlling a vehicle engine or an engine component such as a cylinder based on a target pressure curve. Aspects of the invention relate to a method, a controller, and a vehicle.

BACKGROUND

It is generally known that engines have to be controlled by control units and that control may depend on engine status. For example, one part of the control of an engine of a vehicle is focused on the injection of gasoline or diesel into the combustion chamber of the cylinders of the engine. Some known methods include using specific diagrams or maps, which comprise specific correlations between the engine status and the respective needed injection timing. To provide such specific diagrams or maps, significant time and expense is typically needed to build up the specific diagrams or maps from experiments and test drives. After gathering sufficient information and data from such test drives and experiments, specific correlations must be determined to provide a simulation model for the engine or the cylinders. The resulting particular diagrams or maps are then used for a control method.

SUMMARY

According to an aspect of the present invention there is provided a method of controlling an engine of a vehicle. The method includes determining a target pressure curve for a cylinder of the engine for a first combustion cycle, determining a heat release model for the cylinder for the first combustion cycle, determining a mass flow of fuel from the heat release model to achieve the target pressure curve during the first combustion cycle, and automatically controlling opening of an injector of the cylinder of the engine during the first combustion cycle to provide the determined mass flow of fuel to the cylinder. The method includes determining a real pressure curve during the first combustion cycle and automatically adjusting at least one of the target pressure curve, heat release model or the mass flow for a second, subsequent combustion cycle based on a difference between the target pressure curve and the real pressure curve.

According to another aspect of the present invention there is provided a vehicle engine controller comprising at least one processor and data storage associated with the at least one processor. The processor is configured to: determine a target pressure curve for a cylinder of the engine for a first combustion cycle, determine a heat release model for the cylinder for the first combustion cycle, determine a mass flow of fuel from the heat release model to achieve the target pressure curve during the first combustion cycle, and control opening of an injector of the cylinder of the engine to provide the determined mass flow of fuel to the cylinder during the first combustion cycle. The processor is also configured to determine a real pressure curve during the first combustion cycle, automatically adjust at least one of the target pressure curve, the heat release model or the mass flow based on a difference between the target pressure curve and the real pressure curve, and control the injector during a second, subsequent combustion cycle using the adjusted target pressure curve, heat release model or mass flow.

According to another aspect of the present invention there is provided a vehicle comprising an engine having a plurality of cylinders, a plurality of fuel injectors respectively associated with the cylinders, and a controller comprising at least one processor and data storage associated with the processor. The processor is configured to: determine a target pressure curve for a cylinder of the engine for a first combustion cycle, determine a heat release model for the cylinder for the first combustion cycle, determine a mass flow of fuel from the heat release model to achieve the target pressure curve during the first combustion cycle, and control opening of an injector of the cylinder of the engine to provide the determined mass flow of fuel to the cylinder during the first combustion cycle. The processor is also configured to determine a real pressure curve during the first combustion cycle, automatically adjust at least one of the target pressure curve, the heat release model or the mass flow based on a difference between the target pressure curve and the real pressure curve, and control the injector during a second, subsequent combustion cycle using the adjusted target pressure curve, heat release model or mass flow.

Within the scope of this application it is expressly intended that the various aspects, embodiments, examples and alternatives set out in the preceding paragraphs, in the claims and/or in the following descriptions and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that matter.

BRIEF DESCRIPTION OF THE DRAWINGS

One or more embodiments of the invention will now be described by the way of example only with reference to the accompanying drawings, in which.

DETAILED DESCRIPTION

Figure 1:
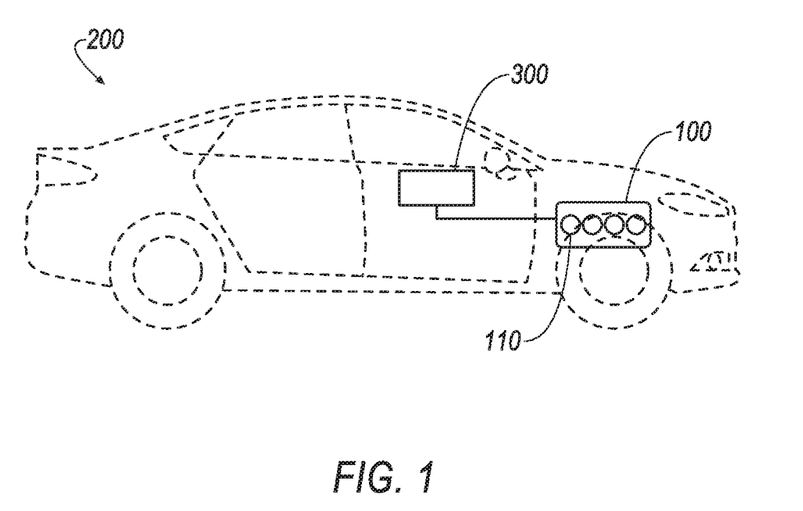
FIG. 1 shows a schematic view of a vehicle designed according to an embodiment of this invention.
Figure 2:
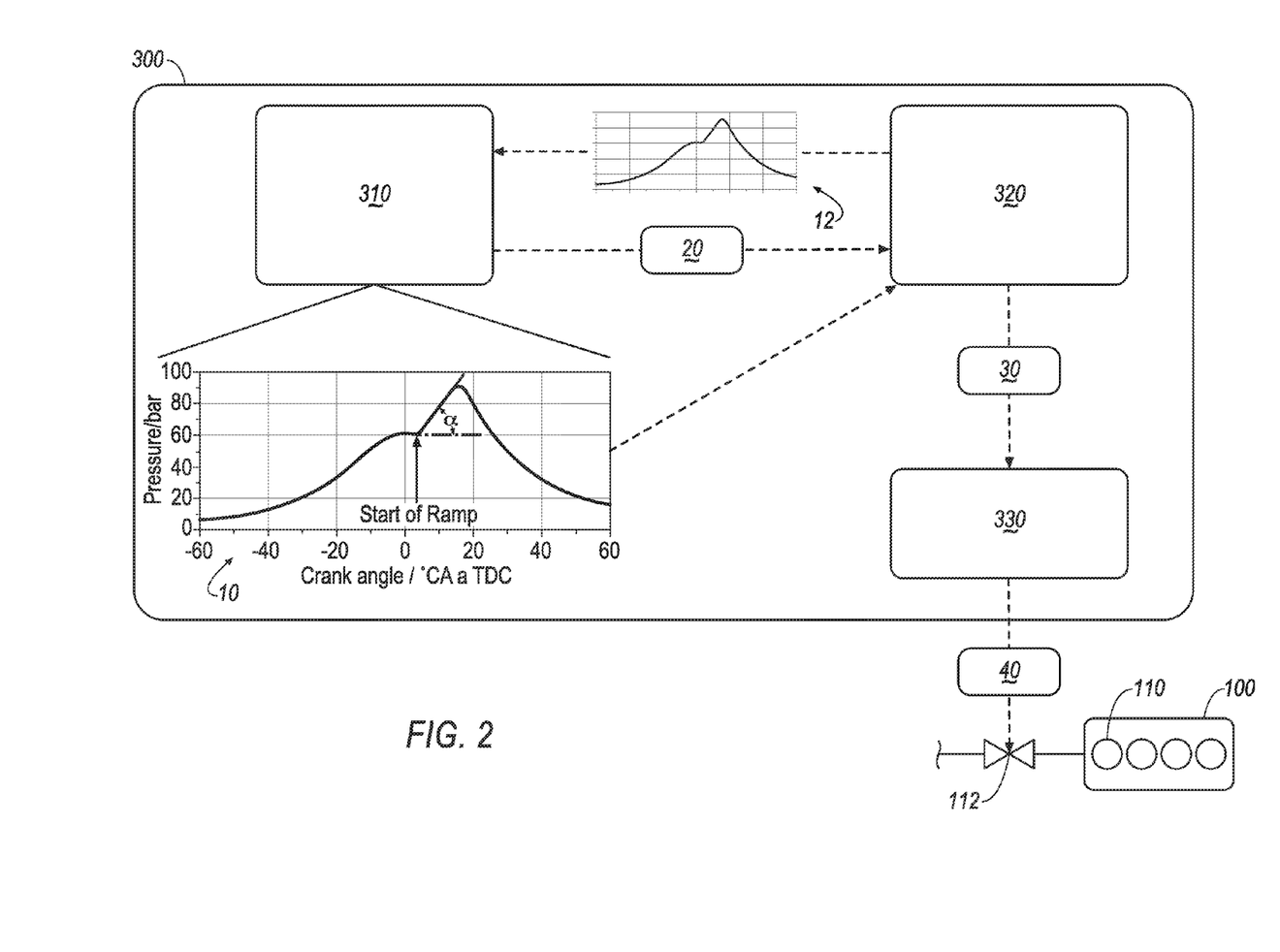
FIG. 2 shows a schematic view of a controller designed according to an embodiment of this invention.

FIGS. 1 and 2 schematically illustrate selected portions of a vehicle 200. An engine 100 has a plurality of cylinders 110. Four cylinders 110 are illustrated for discussion purposes and the number of cylinders of the engine 100 may be different depending on the particular vehicle. A fuel injector 112 is associated with each cylinder 110 for providing fuel to the corresponding cylinder 110. The fuel injectors 112 comprise known component arrangements including, for example, an injector valve.

An on-board vehicle controller or engine controller 300 includes at least one processor that is particularly configured to carry out a control method for achieving a desired operation or function of the cylinders 110 by controlling the fuel injectors 112. The controller 300 also has data storage associated with the processor. For discussion purposes, portions of the processor and data storage are collectively represented in FIG. 2 at 310, 320 and 330. The data storage may be a part of the device in which the controller 300 is embodied (as schematically illustrated in FIG. 2) or it may be accessible by the processor or other portions of the controller 300 so that programming and information in the data storage may be used by the processor on an as needed basis. In one example, the data storage includes programming that the processor uses to carry out the control methods and features of the disclosed embodiment.

As schematically represented in FIG. 2, the controller 300 includes three main modules, which may be realized through hardware, firmware, software or a combination of these. The first module schematically shown at 310 is a curve and model determination module that provides, in part, a target pressure curve for a particular one of the cylinders 110. The target pressure curve indicates desired pressures within the cylinder 110 associated with combustion rates during a working cycle of the cylinder 110.

Figure 3:
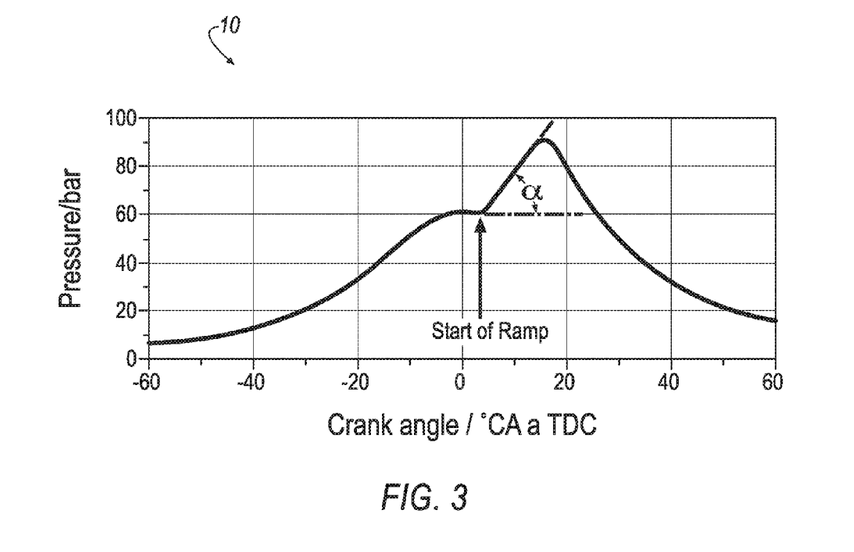
FIG. 3 illustrates an example target pressure curve, FIG. 4 schematically illustrates an example injector profile, and FIG. 5 schematically illustrates an example thermal release correlation.

An example target pressure curve 10 is shown in FIG. 3. The target pressure curve 10 is defined in terms of a crank angle, which is related to movement of the piston of that cylinder on the x-axis and the pressure within the cylinder on the y-axis. In the illustrated example, after about 60° the pressure essentially plateaus until an increase begins at a point which can be referred to as the start of ramp.

As has been determined in other contexts, the start of ramp is almost equal with the start of the combustion within the combustion chamber. Due to that combustion, the pressure rises even more along that ramp and the ramp follows the ramp angle α. After the piston is pushed back by the combustion and the increase of the pressure within the cylinder 110, the pressure curve declines as shown on the portion in FIG. 3 leading to the end of the target pressure curve 10 for a single working cycle of the cylinder 110.

One feature of this invention is that it facilitates selecting the start of ramp and the value (or range) of the ramp angle prior to the working cycle of the cylinder 110 in a predictive, feed forward manner to optimize the combustion process. By optimizing the combustion process in this way, better efficiency is achievable in terms of noise and pollutant emission. For example, in diesel engine embodiments, resultant noise is strongly correlated with the maximum in-cylinder pressure gradient and controlling or selecting the value of ramp angle provides control over the combustion noise. The start of combustion influences rotational imbalance of the engine 100 and, therefore, controlling or selecting the start of ramp indirectly provides control over combustion noise. The centroid of cumulated combustion heat release is a strong indicator of combustion efficiency and is influenced by the start of ramp and the ramp angle so controlling either or both according to an embodiment of this invention facilitates improved efficiency.

According to the illustrated example embodiment, the start of ramp and ramp angle α are controlled so that the in-cylinder pressure gradient corresponds to a desired combustion sound level threshold while the resulting combustion centroid remains as close as possible to its optimum position. The controller 300 achieves the resulting optimum in-cylinder pressure trace by adjusting the fuel injection profile accordingly. In this embodiment, the controller 300 adapts the injector profile for any change in rail pressure and, therefore, decouples the in-cylinder pressure gradient from the rail pressure. This allows for rail pressure and air entrainment increases without generating drawbacks in the combustion sound level. In other words, the pressure gradient and, therefore, the combustion rate, is controlled independently of adjusted rail pressure, which enables decoupling the soot-noise trade-off. Controlling the ramp angle α according to this embodiment combines low soot emission with low combustion sound levels.

There have been feedback, iterative approaches that have demonstrated the usefulness of controlling the so-called Alpha-Process but they suffer from the drawbacks of requiring significant processing capacity and difficulty in achieving a quick enough response to provide a target curve for a subsequent working cycle of a cylinder before the engine condition or status changes. One challenge associated with controlling vehicle engines using such an approach is that the engine status is variable and different conditions yield differing results.

The curve and model determination module 310 determines the target pressure curve in a feed forward manner in the time between a previous combustion cycle and the combustion cycle in which the control will be utilized. The controller 300 ultimately predicts the full injection profile including the number of injections, the injection timing and the injection valve energizing durations, which result in the desired combustion rate. A feature of the controller 300 is that it determines in-cylinder gas state traces before the onset of the actual working cycle.

The curve and model determination module 310 in some embodiments uses engine map data that is obtained in a known manner to determine the desired start of ramp and ramp angle α. Map data may be predetermined for a variety of engine conditions and the pressure curve determination module obtains an indication of the engine condition or status to be able to select the appropriate map data for setting the target pressure curve. The map data in some embodiments corresponds to a thermodynamic engine model. The example approach keeps computation requirements low for predicting the required injection profile. Additionally, different engine configurations may benefit from the same map data as it is thermodynamic-model-based. It is also possible to address issues like component wear and fuel differences through a learning mechanism directly adapting the affected combustion model parameter.

The engine map data is based on in-cylinder gas states that are determined along the crank angle axis from the intake valve closure (IVC) until the exhaust valve opening (EVO). The in-cylinder gas state at IVC is well known from mean-value cylinder filling models, which consider the EGR strategy, and the charge air conditions. The target pressure curve 10 is determined in one example based on a desired start of ramp and angle of ramp using polytropic compression from IVC until start of ramp followed by constant pressure increase according to the ramp angle alpha until the end of ramp and then polytropic expansion from the end of ramp until EVO. Experimental or empirical data may be used to confirm or develop the engine map data.

The curve and model determination module 310 also determines a heat release model 20. This model is based on a difference between the cumulated injected fuel energy ready for conversion after ignition delay and the heat energy that has already been released for each sample time t within the combustion cycle. This energy difference represents the maximum potential for instantaneous heat release and can therefore be correlated with the current burn rate. The maximum heat releasing potential cannot be fully used, however, because of a limited mixing rate of fuel and air. The heat release model 20 includes a combustion rate factor to scale down the maximum heat releasing potential. In one embodiment, the combustion rate factor describes the rate with which the current maximum heating potential can be converted and may be in units of 1/second.

The heat release model 20 includes an ignition delay as a state variable and the combustion rate factor as a calibration parameter. The ignition delay indicates a correlation between the fuel conversion and the hydraulic fuel injection. For example, a longer ignition delay results in a higher amount of unburned fuel energy introduction and a higher fuel air mixture. This results in an increased maximum heat releasing potential. Accordingly, the heat release model 20 includes an increase for higher ignition delay.

Using a continuous combustion rate factor correlated to the burn rate allows a very accurate prediction of the burn rate for a given injection profile. Accordingly, a fuel injection rate can be accurately predicted for a determined burn rate. In the illustrated embodiment, the heat release model 20 and the target pressure curve 10 are provided to a determination module, which is now able to take into account the correlation of the heat release model 20 and determines the mass flow 30 of fuel which is needed to achieve the target pressure curve 10. That mass flow 30 can be considered in terms of a mass flow curve that is resolved over the crank angle. In one example, the mass flow 30 is based on an inversion of the heat release model 20 to obtain a converted fuel rate trace profile.

Figure 4:
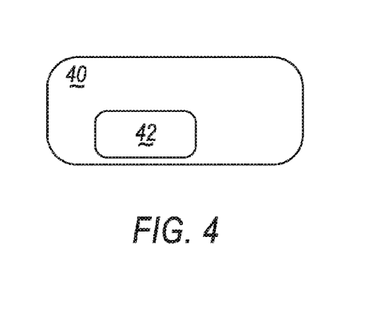

The target value of the feed forward controller 300 is the fuel injection rate, which is determined by a signal module 330 based on the target pressure curve 10 and the heat release model 20. The output from the signal module 330 schematically shown at 40 in FIGS. 2 and 4 is an injector profile 40 comprising control signals 42. The injector profile 40 controls the start of energizing and the energizing duration for each injection event to be applied to the injection system for a particular injection cycle. In this example, the injector profile 40 is based on the inverse of the heat release model and provides a continuous hydraulic injection rate profile.

The injector profile 40 is digitized in some embodiments based on known injector behavior characterized by the hydraulic flow rate, minimum hydraulic dwell time, injection duration, and needle opening or closing behavior. Such characteristics of the injector 112 are known and depend on the configuration of a given injector.

The control signals 42 that give a specific opening time and closing time for the fuel injector 112 associated with the cylinder 110 of interest are determined based on an inversion of the hydraulic injection profile. The signals for the opening and closing times can be considered an electric injection profile. The opening and closing times for each injection event may be instants or time periods, depending on the needs of a particular embodiment control of the opening and the closing of the injector 112.

The embodiments that become apparent from the preceding description include feed forward control that is based on determining a desired synthetic in-cylinder pressure trace corresponding to the Alpha process. The target pressure curve is a basis for a heat release model, which in turn serves as a basis for a continuous, hydraulic fuel injection profile. Digitization allows the fuel injection profile to be used for controlling currently available fuel injectors. The predictive control technique includes crank angle resolved mean-value models with low computational effort that overcomes the speed of convergence problems associated with prior feedback based approaches. The physical model based formulation keeps the calibration effort low. The model parameters directly refer to geometric and thermodynamic properties that are well known for a particular engine configuration.

Some embodiments include some feedback control based on an initial feed forward control. For example, the approach described above is applied to a first combustion cycle. Actual pressure data from that first combustion cycle provides a basis to determine an actual or real pressure curve during the first combustion cycle. Any difference between that real pressure curve and the target pressure curve provides an indication whether the cylinder performance was as intended. Such a difference is a basis for adjusting one or more aspects of the control used for a second, subsequent combustion cycle.

In the embodiment of FIGS. 1 and 2 some feedback or closed loop control is available as schematically illustrated. At the end of a first combustion cycle, sensors or detectors (not illustrated) associated with the engine 100 or cylinders 110 provide pressure information to the determination module 320 indicative of the actual pressure in the cylinder 112 during the first combustion cycle. The determination module 320 provides such information to the determination module 310. In this example, the determination module 320 determines a real pressure curve 12 and provides that to the determination module 310.

The determination module 310 determines whether there is any difference between the real pressure curve from the first combustion cycle and the target pressure curve for that combustion cycle. If there is any difference the determination module 310 determines whether the difference is such that an adjustment to the control would be beneficial or necessary. In this example, when there is a difference between the real pressure curve 12 and the target pressure curve 10, the controller adjusts at least one portion of the control information for a next or subsequent, second combustion cycle. For example, the controller 300 may adjust the target pressure curve for the second combustion cycle based on the difference between the real pressure curve 12 and the target pressure curve 10. Alternatively, the controller 300 adjusts the heat release model or the mass flow in a manner that facilitates reducing or eliminating at least one difference between the real pressure curve and the target pressure curve of the first combustion cycle.

Adjusting at least one of the target pressure curve, the heat release model, and the mass flow based on the real pressure curve allows for fine tuning the combustion control in a manner that brings actual engine operation closer to the intended operation associated with the desired target pressure curve. The adjustment, although based on feedback, does not negate the feed forward aspects of the disclosed control techniques that provide a target pressure curve, heat release model and mass flow in advance of a combustion cycle. Instead, the feedback aspects of the example embodiment enhance the overall control features by allowing for achieving actual conditions that are as close as possible to the predicted, target conditions.

Figure 5:
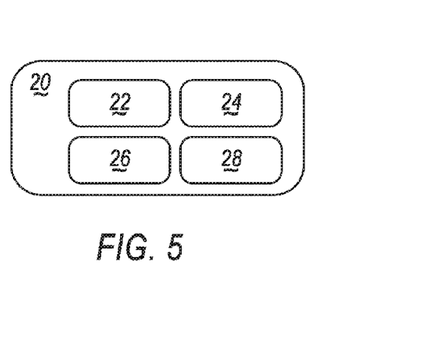

Another feature of the example embodiment is schematically shown in FIG. 5. The heat release model 20 includes a variable combustion rate factor 22. The variation is related to the situation of the crank angle such that the combustion factor 22 can vary over the change of crank angle during rotation of the engine 100. The example heat release model 20 also includes a combination factor 24 that is useful to adapt the combustion factor 22 to specific differences associated with different combustion types, such as diffusion combustion or mixture combustion.

In some examples, the combustion factor 22 is a real combustion factor based on information obtained during the previous combustion cycle. The real combustion factor facilitates adapting the heat release model to the specific, real situation of the engine 100. Such a combustion factor can now be provided as a real combustion factor from the previous cycle of the cylinder and therefore, this real combustion factor is used for the following cycle of the method according to the present invention. In that case, it is now possible to create an easy and in particular less complex feedback, which is in particular of advantage in stable load situations. It leads to a better control through the respective feedback in this closed loop control cycle. In particular, the combustion factor trace is corrected based on an in-cylinder pressure measurement of the previous combustion cycle. The corrected combustion factor trace can now be used in the subsequent cycle to calculate a correct fuel injection mass flow trace.

In the example of FIG. 5, a correction factor 28 is included in the heat release model. The correction factor 28 is based on information from at least one of the specific load situation of the engine 100 and the real pressure curve 12 of the previous combustion cycle.

Beside the general possibility of an open loop control method this aspect of the present invention is in particular focused on a closed loop control method of an engine of a vehicle. To close the loop and provide a feedback of information, according to an aspect of the present invention a real pressure curve is determined for the cylinder of the engine. At a further step, a provision of a target pressure curve and/or a heat release model is carried out for the next cycle of the control method for the cylinder of the engine based on the determined real pressure curve.

As it can be derived from above, the feedback is provided by the determination of a real pressure curve. The real pressure curve, for example, can be measured by a sensor of the cylinder of the engine. Therefore, the real pressure inside of the cylinder is provided by the sensor over time or respectively over a crank angle of the engine. Therefore, the real pressure curve provides the feedback and, for example, can be compared to the target pressure curve and/or the heat release model. Such a comparison can be used to determine a difference between the target to be achieved by the control method and the respective result which has been achieved by the control method. The quality of the control can therefore be determined and be used for the next cycle of the control method.

In particular, the real pressure curve is used with the heat release model to amend the heat release model in particular in a mathematical way. For example, specific correction factors or combustion factors can be adapted within the heat release model which is discussed in more detail later on. Therefore, the real pressure curve can be used directly to adapt the target pressure curve as well as indirectly to adapt a heat release model for the next cycle. That way, the inventive method uses information from the previous cycle to adapt the control steps and the respective control signal for the following cycle of the respective cylinder. This leads to an even better result and less difference between a target pressure curve and the real pressure curve for the next steps of the inventive method, in particular for the next cycles.

To determine the real pressure curve, which can also be understood as a real pressure curve, several measurements can take place. For example, a cylinder pressure feedback can be obtained from different technologies. This could be a pressure sensor, an ion current sensor, an injection mass flow sensor, an injection pressure sensor or the like. Also a detailed combustion model, a torque sensor and such a combustion model, the engine speed fluctuations and such a combustion model and the like can be used. In general, the real pressure curve can be measured directly or indirectly or can even be provided fully of partly by the use of a synthetic model.

The feedback of the real pressure curve can be used in two different ways. The first use can be understood as a short-term use for feedback control to achieve a specific target parameter from working cycle to working cycle. The second use can be understood as long term use to adapt the overall method to changed general conditions, for example different quality of fuel, different ambient parameters or ageing of the engine. For the short-term use, the feedback of the real pressure can be used as following. Said feedback from the previous cycle can be used to provide a burn rate and a heat release deviation trace (crankangle resolved within the full working cycle). The heat release model is used based on the real pressure curve to calculate a required manipulation of the fuel injection mass flow to diminish the control deviation. This can result in a new corrected fuel mass flow for control of the injector during the current working cycle. The adaption of the target pressure curve is in particular use during the long-term feedback loop discussed above.

The provision of a target pressure curve is now the provision of a parameter in form of a target pressure curve which is used to provide the engine with an effect to be achieved, namely a target pressure curve. It has to be noted that in the broad scope according to the present inventive method, the target pressure curve does not need to have any feedback from a real pressure curve, which is in reality achieved by the inventive method within the cylinder. The target pressure curve is used as a theoretical forecast, which is the basis for the control method according to this aspect of the present invention.

The target pressure curve itself gives no information about specific sensor or control signals, which can be used for the control of the engine. Such a correlation is established as described above with a heat release model that correlates the pressure and heat using time and crank angle for the engine to ensure timely correlation between the different determinations.

Due to the fact that the heat release model is correlated with the pressure within the cylinder as well as with the mass flow of the fuel within the cylinder, the correlation of the thermal release is able to form a correlation between the target pressure curve as well as the mass flow. Based on that interface which is built up by the thermal release correlation, it is now possible by the method for controlling an engine according to this aspect of the present invention to determine the mass flow of the fuel from that heat release model to achieve the target pressure curve in particular theoretically. After having done that determination step, a provision of the determined mass flow is carried out to control the opening of an injector of that cylinder of the engine.

The injector of a cylinder can, for example, be an injector valve or any other kind of valve enabling fuel to enter the combustion chamber of the cylinder. The opening of that injector leads to a mass flow of fuel entering that cylinder. The closing of that injector stops that mass flow of fuel.

As it can be derived from the preceding description, the determined mass flow is now one possibility to offer control signals to the opening and closing of the injector of that cylinder. Therefore, now a control method is given by this aspect of the present invention which enables a provision of a target pressure curve and translates that target pressure curve by the use of a heat release model into control signals to achieve a determined mass flow. Feedback from the cylinder about the real achieved pressure curve is not necessary to carry out that method.

As it can be derived from the preceding description, no experiment or test drive has to be carried out to use the disclosed control method. The target pressure curve can be provided, for example, from a specific diagram or map or as one single standard target pressure curve for all different status of the engine. Of course, it is also possible to provide different target pressure curves for different situations of the engine.

Beside the reduction of cost and time for establishing the basis for the control method, even the quality of the control itself is increased by the inventive method. Due to the fact that a correlation using the heat release model is used within the inventive method, now an online and real time control is possible within the engine itself. Therefore, beside the fixed specific diagrams or maps from the state of the art now a much higher flexibility can be used within the inventive control method.

Due to the fact that the method according to this aspect of the present invention does not need any feedback information, it can also be described as a method for pre-control of an engine of a vehicle. The provision of the target pressure curve can also be defined as a provision of a synthetic pressure curve.

The injector control signals in some embodiments specifically take into account the mechanical and real possibilities of the injector itself. Therefore, specific control signals can be provided by the inventive method according to this aspect of the present invention, which can be used in the control of the engine of the vehicle. In the case of the injector being configured as an injector valve, such an injector profile can be embodied as an electric fuel injection profile. Such an injector profile can be configured to adapt the present method to different kinds of engines. Therefore, the method can be provided generally and can be specified by the provision of a respective engine specific injector profile.

It is further possible that according to an aspect of the present invention the method is characterized in that the injector profile is correlated with a digital injector procedure of the injector. An injector procedure in a digital manner has to be understood that the injector is in a mechanical real way only possible to open and close. There is no possibility of such an injector to regulate or control specific and different amounts of mass flow passing that injector. It can, for example, be considered to be an opening and closing valve in contrast to a continuous controllable valve. A digitalization step according to this aspect leads to a further reduction of complexity in particular with respect to the mechanical construction of the injector itself. No quantitative opening or closing has to be considered according to this aspect of the present invention. The determined mass flow rate can be digitalized by a hydraulic fuel injector model. Such a model can generate a corresponding, digital fuel injection profile, taking into account fuel injector hardware specific boundary conditions, such as minimum dwell time or minimum injection quantities/energizing durations. Further it is possible that the fuel injector model generates the corresponding electric actuation signal, consisting of a number of injections, injection timings and/or energizing durations for each injection event. Thus, a control unit, carrying out an inventive method, is capable in determining the full electric injection profile automatically.

It is also possible that according to an aspect of the present invention the method is characterized in that the injector profile is correlated with a continuous injector procedure of the injector. In contrast to the aspect discussed in the paragraph above, it is possible to have a more complex injector comprising the possibility of a quantitative control. Due to the fact that the injector profile now comprises the information of that continuative possibility of the injector, this can be taken into account so that, for example, respective control signals can be configured to fit to that continuous injector procedure of the injector. Such a continuous mass flow can for example be realized by a rate shaping capable fuel injector as an injector. An injector model can calculate the corresponding electric injector actuation signals.

A further possibility is achieved according to an aspect of the present invention wherein the method is characterized in that the target pressure curve is provided in dependence of the engine operation point, the engine status and/or the cylinder status. Beside the general possibility that one single target pressure curve is used for all control steps according to the inventive method it is also possible that one or even more different target pressure curves are used. The dependency as to the engine status and/or the cylinder status can for example be focused on the load situation of the engine, the engine operation point (rotational speed, load, etc.), engine mode (normal, regeneration of particle filter, etc.) and/or the engine condition (engine temperature, ambient temperature, etc.). For example, a difference can be expected for a full load situation, a part load situation, a fuel saving mode for the engine or the like. The dependency can, for example, be stored in a respective specific characteristic diagram or map, giving a specific and easy as well as fast correlation between the status of the engine and/or the cylinder and the respective target pressure curve to be used. This leads to an even better adaptation to different load situations of the engine. Also engine load information like the mean indicated pressure can be inherited in the target pressure curve. Beside the use of the respective status for the target pressure curve, that information can also be used for further steps of an inventive method. This could be for example the number of injections/valve openings, timing of such injections/openings, energizing durations, are determined in particular for each injection event.

It is further possible that according to an aspect of the present invention the method is characterized in that the provision of the target pressure curve comprises at least two iterations, when the target pressure curve is optimized as to at least one parameter. Beside the aspect discussed in the paragraph above, it is also possible to carry out an optimization within the inventive method. This leads to a possibility to consider two or more iterations and considering the optimization of a parameter. Such a parameter can for example be a parameter of the pressure curve itself, for example a ramp angle named α or at a point at which this ramp starts, namely the start of ramp SOR. In some embodiments, the length of the ramp is optimized to achieve a predefined mean pressure. The iterations can for example be focused on a parameter like a mean pressure of the respective cylinder. This leads to the possibility that the basis or the starting point of the present control method is optimized as to the specific situation within the engine. This leads to further accuracy when achieving efficient control of the engine and the cylinder. It has to be noted that this is a pre-optimization and not a feedback control.

According to a further aspect of the present invention, the method is characterized in that the heat release model comprises a variable combustion factor, wherein the combustion factor is in particular dependent from at least one engine parameter. These variable combustion factors are in contrast to the commonly known fixed combustion factors variable in particular dependent from a respective parameter of the engine. One of those parameters can, for example, be the crank angle such that now the combustion factor can take into account the crank position as to the crank angle. This leads to a better real time adaption during the process of the combustion inside of the cylinder. It also allows a better correlation of the target pressure rate and the aim to achieve an efficient control of the engine.

According to an aspect of the present invention, for a pre-control and/or a control concept a heat release model can be used to link the following two domains: The hydraulic fuel injection profile (including injection timings, injection quantities and number of injections) and the corresponding in-cylinder combustion rate, i.e. heat release and/or burn rate. However, one single hydraulic fuel injection profile can result into a variety of different in-cylinder combustion rates, depending on the current in-cylinder condition. To characterize the current in-cylinder condition, the so called "combustion factor" can be introduced, which accounts for e.g. level of turbulence, temperature- and pressure level. Thus, the combustion factor is required to be formulated in dependency of the engine operation point and the engine condition. Further, the in-cylinder condition changes within the course of the combustion. Therefore, the combustion factor can generally be variable within the combustion progress. For each crankangle position within the combustion process, an individual combustion factor value can be identified. This is the reason why the combustion factor can be considered as a trace, rather than a single value. Summarizing, the combustion factor can be considered as a parameter to adjust the combustion reaction for a given fuel injection profile.

It is further a possibility that according to an aspect of the present invention the method is characterized in that the real combustion factor is determined on the basis of a combustion rate and/or an injector profile. As it can be derived from the paragraph above, the real combustion factor can be used to adapt the heat release model for the following cycle. Due to the fact that the real combustion factor can beside a specific measurement also be determined by further parameters, according to this aspect of the invention the necessity of providing a sensor is reduced significantly. The combustion factor according to this aspect is now also determined based on at least one parameter, namely a combustion rate and/or an injector profile. Therefore, the feedback can be given even without any provision of additional sensors to the engine and/or the cylinder respectively. The possibility of advanced feedback is therefore provided without addition of cost and complexity of the whole structure.

According to a further aspect of the present invention the method is characterized in that the steps of determining a real pressure curve and providing a target pressure curve and/or a heat release model based on the determined real pressure curve are blocked during transient load situations of the engine. This leads to a situation where in particular in complex load situations of the engine, the feedback is blocked in general. A transient situation as to the load situation of the engine leads to large differences as to the load situation within the engine. For example, in the case a vehicle is accelerating, or the acceleration process has just come to an end, there are huge changes in the load situations between the difference cycles. If a change between the previous and the further cycle come above a specific value, this would lead to a wrong feedback, due to the fact that the following cycle is in this specific case a lot different to the previous cycle. In that transient situation as to the load situation, the blocking of such feedback leads to the blocking of misleading feedback and therefore increases the quality of the control method also in transient load situations.

According to a further aspect of the present invention the method is characterized in that based on the determined real pressure curve and/or a parameter of the engine a correlation factor is determined and provided within the heat release model. This has to be understood as an adaption of the real pressure curve and/or parameter of the engine into a correction factor of the heat release model in particular respective mathematical correlation. This leads further to advantages in particular in the transient load situation. For example, such a correction factor can consider a respective correction which is able to overcome the disadvantages of the feedback misleading from the previous cycle in a transient load situation. Such correction factor can also be discussed as a so-called gain factor. Without blocking of the feedback according to the paragraph above, in this case an overall coverage of the control method is even better provided by this aspect.

As described above, the controller 300 is particularly configured to provide a target pressure curve for a cylinder 110 of the engine 100 for a first combustion cycle. The controller 300 analyzes the pressure of that target pressure curve to obtain a corresponding target heat release model that is based on at least one of a heat release rate, a target burn rate, and a target combustion rate. The heat release model, whichever basis it has, is related to the engine crank angle. In the disclosed embodiments, the controller 300 uses feedback based on actual measured in-cylinder pressure trace information from the first combustion cycle or working cycle. The controller 300 analyses the real pressure curve or trace to determine any differences between the actual pressure in the cylinder and the target pressure curve. Any such difference is useful to refine or adjust at least one of the control aspects, such as the target pressure curve, the heat release model or the mass flow for a next or subsequent, second combustion cycle for the same cylinder.

In some embodiments, the real performance feedback information allows the controller 300 to obtain a measurement based on at least one of the target heat release rate, target burn rate, and target combustion rate. Using such information, the controller 300 is configured to provide a burn rate and a heat release deviation trace, which are crank angle resolved, within the first working cycle from intake valve closure till exhaust valve opening timing. The controller 300 also applies a heat release model to calculate the required manipulation of the fuel injection mass flow to diminish the control deviation, which results in a new, corrected continuous fuel mass flow trace for the second combustion or working cycle. The controller then uses the mass flow trace to provide the determined mass flow of the fuel by controlling or generating electric actuation signals to control opening of an injector of that cylinder of the engine.

The preceding description is illustrative rather than limiting in nature. Variations and modifications to the disclosed embodiments may become apparent to those skilled in the art that do not necessarily depart from the essence of this invention. The scope of legal protection given to this invention can only be determined by studying the following claims.

The invention claimed is:
1. A method of controlling an engine of a vehicle, the method comprising:
   determining a target pressure curve for a first combustion cycle of a cylinder of the engine;

determining a heat release model for the cylinder for the first combustion cycle;
determining a mass flow of fuel from the heat release model to achieve the target pressure curve during the first combustion cycle;
automatically controlling an injector of the cylinder of the engine to provide the determined mass flow of fuel to the cylinder during the first combustion cycle;
determining a real pressure curve during the first combustion cycle;
automatically adjusting the heat release model based on a difference between the target pressure curve and the real pressure curve by adjusting the heat release model using a combustion rate factor that describes a rate with which a current maximum heat release potential can be converted, the combustion rate factor being formulated dependent on an operating point and condition of the engine during the first combustion cycle; and
using the adjusted the heat release model to determine the mass flow for a second, subsequent combustion cycle.

2. The method according to claim 1, comprising
determining an injector profile based on the determined mass flow of fuel, the injector profile comprising an opening time and a closing time for the injector.

3. The method according to claim 1, comprising determining the target pressure curve based on at least one of an operation point of the engine, a status of the engine and a status of the cylinder.

4. The method according to claim 1, comprising
determining the combustion rate factor as a real combustion rate factor from the real pressure curve; and
using the real combustion rate factor when automatically adjusting the heat release model.

5. The method according to claim 1, wherein
the combustion rate factor comprises a variable combustion factor based on at least one engine parameter.

6. The method according to claim 5, wherein the combustion rate factor comprises a combination factor combining at least two different combustion types.

7. The method according to claim 1, comprising
determining a load situation of the engine; and
temporarily suspending performing determining the real pressure curve and automatically adjusting the heat release model when the load situation is a transient load situation.

8. The method according to claim 1, comprising
determining a correlation between the heat release model, the target pressure curve and the mass flow;
determining the mass flow to achieve the target pressure curve for the second, subsequent combustion cycle from the adjusted heat release model; and
using the determined mass flow to achieve the target pressure curve for the second, subsequent combustion cycle to control opening of an injector to the cylinder during the second combustion cycle.

9. The method according to claim 1, comprising
using the adjusted heat release model for translating the target pressure curve into control signals for opening and closing the injector during the second combustion cycle.

10. A vehicle engine controller, comprising
at least one processor and data storage associated with the at least one processor, the processor being configured to:
determine a target pressure curve for a cylinder of the engine for a first combustion cycle;
determine a heat release model for the cylinder for the first combustion cycle;
determine a mass flow of fuel from the heat release model to achieve the target pressure curve during the first combustion cycle;
control opening of an injector of the cylinder of the engine to provide the determined mass flow of fuel to the cylinder during the first combustion cycle;
determine a real pressure curve during the first combustion cycle;
automatically adjust the heat release model and based on a difference between the target pressure curve and the real pressure curve by adjusting the heat release model using a combustion rate factor that describes a rate with which a current maximum heat release potential can be converted, the combustion rate factor being formulated dependent on an operating point and condition of the engine during the first combustion cycle; and
use the adjusted heat release model to determine the mass flow for a second, subsequent combustion cycle.

11. The vehicle engine controller according to claim 10, wherein the at least one processor is configured to determine an injector profile of the injector based on the determined mass flow of fuel, the injector profile comprising an opening time and a closing time for the injector.

12. The vehicle engine controller according to claim 11, wherein the at least one processor determines the target pressure curve based on at least one of an operation point of the engine, a status of the engine and a status of the cylinder.

13. The vehicle engine controller according to claim 10, wherein the at least one processor
determines a load situation of the engine; and
temporarily suspends determining the real pressure curve and automatically adjusting the heat release model when the load situation is a transient load situation.

14. The vehicle engine controller according to claim 10, wherein
the combustion rate factor comprises a variable combustion factor based on at least one engine parameter.

15. The vehicle engine controller according to claim 10, wherein the combustion rate factor comprises a combination factor combining at least two different combustion types.

16. The vehicle engine controller according to claim 10, wherein the at least one processor is configured to
determine the combustion rate factor as a real combustion rate factor from the real pressure curve; and
use the real combustion rate factor when automatically adjusting the heat release model.

17. The vehicle engine controller according to claim 10, wherein the at least one processor is configured to
determine a correlation between the heat release model, the target pressure curve and the mass flow;
determine the mass flow to achieve the target pressure curve for the second, subsequent combustion cycle from the adjusted heat release model; and
use the determined mass flow to achieve the target pressure curve for the second, subsequent combustion cycle to control opening of an injector to the cylinder during the second combustion cycle.

18. The vehicle engine controller according to claim 10, wherein the at least one processor is configured to use the adjusted heat release model for translating the target pressure curve into control signals for opening and closing the injector during the second combustion cycle.

19. A vehicle comprising:
an engine having a plurality of cylinders;

a plurality of fuel injectors respectively associated with the cylinders; and a controller comprising at least one processor and data storage associated with the processor, the at least one processor being configured to:

determine a target pressure curve for a cylinder of the engine for a first combustion cycle;

determine a heat release model for the cylinder for the first combustion cycle;

determine a mass flow of fuel from the heat release model (20) to achieve the target pressure curve during the first combustion cycle;

control opening of an injector of the cylinder of the engine to provide the determined mass flow of fuel to the cylinder during the first combustion cycle;

determine a real pressure curve during the first combustion cycle;

automatically adjust the heat release model based on a difference between the target pressure curve and the real pressure curve by adjusting the heat release model using a combustion rate factor that describes a rate with which a current maximum heating potential can be converted, the combustion rate factor being formulated dependent on an operating point and condition of the engine during the first combustion cycle; and use the adjusted heat release model to determine the mass flow for a second, subsequent combustion cycle.

20. The vehicle of claim 19, wherein the at least one processor determines a load situation of the engine; and temporarily suspends determining the real pressure curve and automatically adjusting the at least one of the heat release model or the mass flow when the load situation is a transient load situation.

* * * * *

UNITED STATES PATENT AND TRADEMARK OFFICE
CERTIFICATE OF CORRECTION

PATENT NO. : 9,909,522 B2
APPLICATION NO. : 15/097831
DATED : March 6, 2018
INVENTOR(S) : Christian Jörg et al.

It is certified that error appears in the above-identified patent and that said Letters Patent is hereby corrected as shown below:

In the Claims

In Claim 1, Column 13, Line 19; replace "adjusted the heat release" with --adjusted heat release--

In Claim 8, Column 13, Line 54; replace "opening of an injector to the" with --opening of the injector of the--

In Claim 10, Column 14, Line 11; replace "model and based" with --model based--

In Claim 17, Column 14, Line 58; replace "of an injector to the" with --of the injector of the--

In Claim 19, Column 15, Line 11; delete "(20)"

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*